United States Patent
Koike et al.

(10) Patent No.: US 6,882,142 B2
(45) Date of Patent: Apr. 19, 2005

(54) MAGNETIC SPEED SENSOR-EQUIPPED BEARING ASSEMBLY AND MOTOR USING THE SAME

(75) Inventors: Takashi Koike, Iwata (JP); Tomomi Ishikawa, Iwata (JP)

(73) Assignee: NTN Corporation, Osaka (JP)

( * ) Notice: Subject to any disclaimer, the term of this patent is extended or adjusted under 35 U.S.C. 154(b) by 14 days.

(21) Appl. No.: 10/321,553

(22) Filed: Dec. 18, 2002

(65) Prior Publication Data

US 2004/0061494 A1 Apr. 1, 2004

(30) Foreign Application Priority Data

Sep. 30, 2002 (JP) ........................................ 2002-284979

(51) Int. Cl.⁷ ................................................. G01P 3/54
(52) U.S. Cl. ............... 324/174; 324/207.12; 324/207.2; 384/448
(58) Field of Search ....................... 324/207.12, 207.18, 324/207.19, 207.2, 207.21, 207.25, 173, 174; 384/448

(56) References Cited

U.S. PATENT DOCUMENTS 4,369,405 A * 1/1983 Sato et al. ................... 324/174
5,084,674 A * 1/1992 Lachmann et al. .......... 324/174
5,302,893 A * 4/1994 Yoshimura ............. 324/207.22
5,900,727 A * 5/1999 Griffen et al. ............... 324/173

FOREIGN PATENT DOCUMENTS

GB 2176616 A * 12/1988

OTHER PUBLICATIONS

Patent Abstract of Japan 2002-174258 Jun. 21, 2002.

* cited by examiner

*Primary Examiner*—N. Le
*Assistant Examiner*—Reena Aurora

(57) ABSTRACT

To minimize change in duty ratio of an output signal brought about by a leakage flux and to obtain a sensor output stabilized even under an environment of use abundant of the leakage fluxes, a sensor-equipped bearing assembly 31 includes a rotatable race member 32 provided with a to-be-detected portion 1 having a magnetic characteristic in which N and S magnetic poles alternate with each other. In face-to-face relation with this to-be-detected portion 1, a magnetic detecting portion 2 is secured to a stationary race member 33. The magnetic detecting portion 2 is made up of magnetic sensors arranged in a direction circumferentially of the race members 32, 33 and each capable of providing an analog output. A differential output generating means 7 is provided for processing a differential output of the adjoining two magnetic sensors 2a and 2b as an encoder signal for one phase.

5 Claims, 13 Drawing Sheets

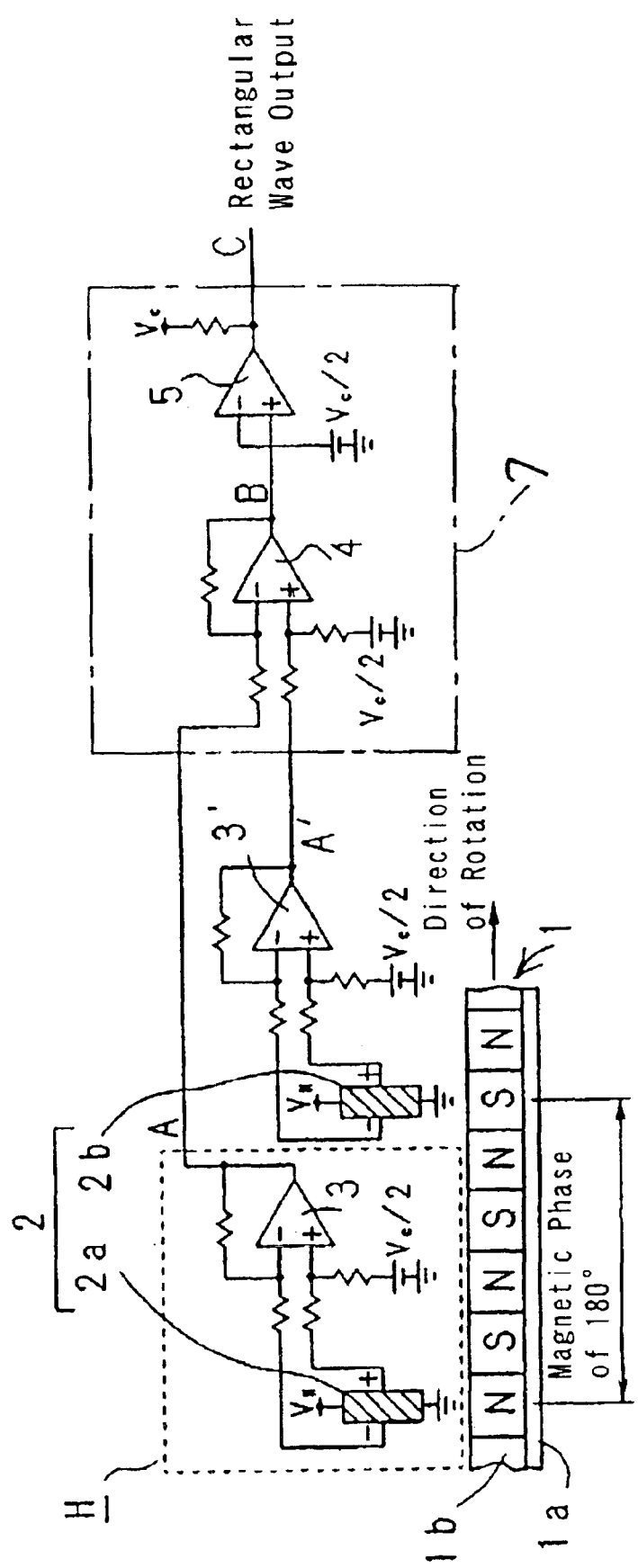

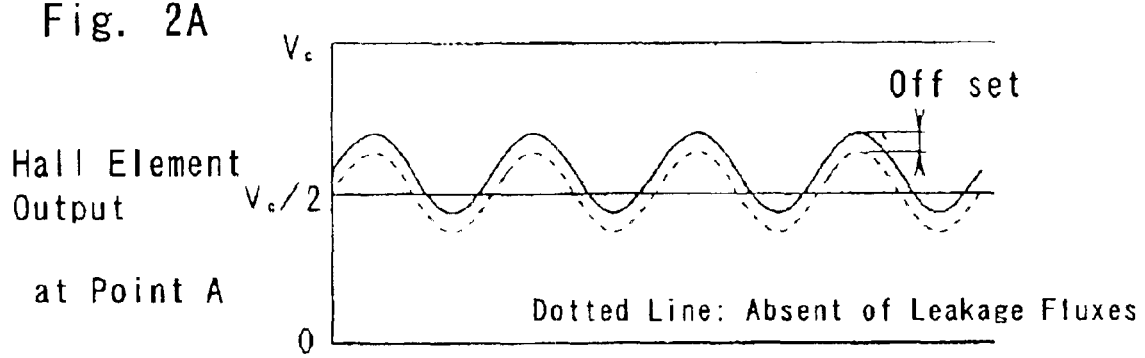
Fig. 2A
Hall Element Output at Point A
Dotted Line: Absent of Leakage Fluxes
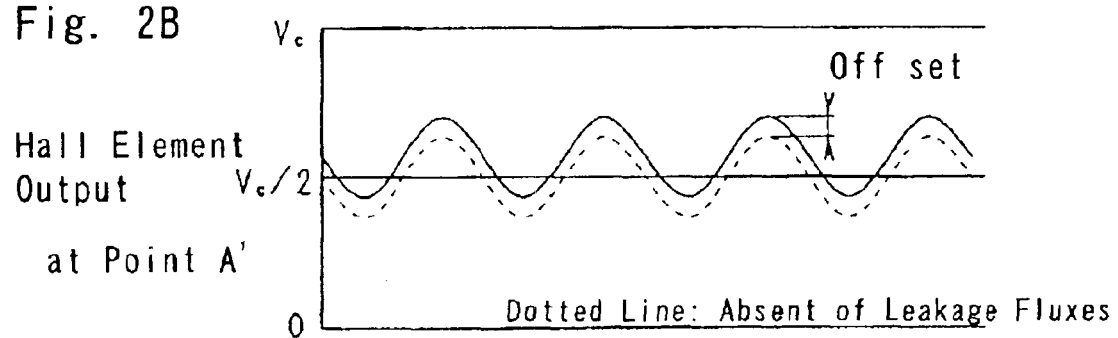
Fig. 2B
Hall Element Output at Point A'
Dotted Line: Absent of Leakage Fluxes
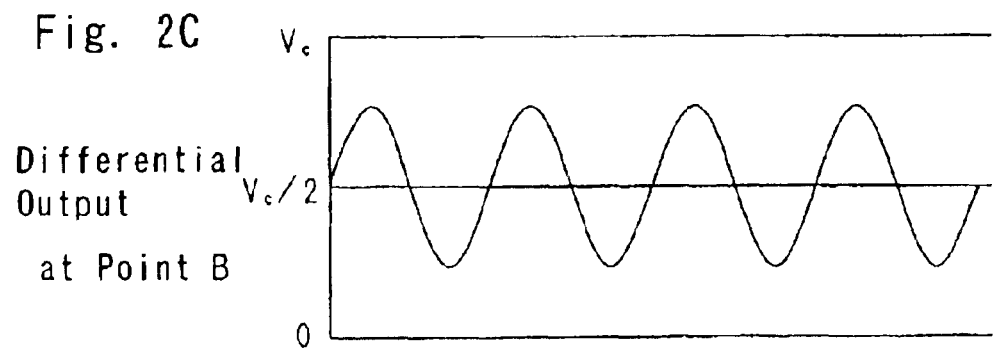
Fig. 2C
Differential Output at Point B
Fig. 2D  Point C

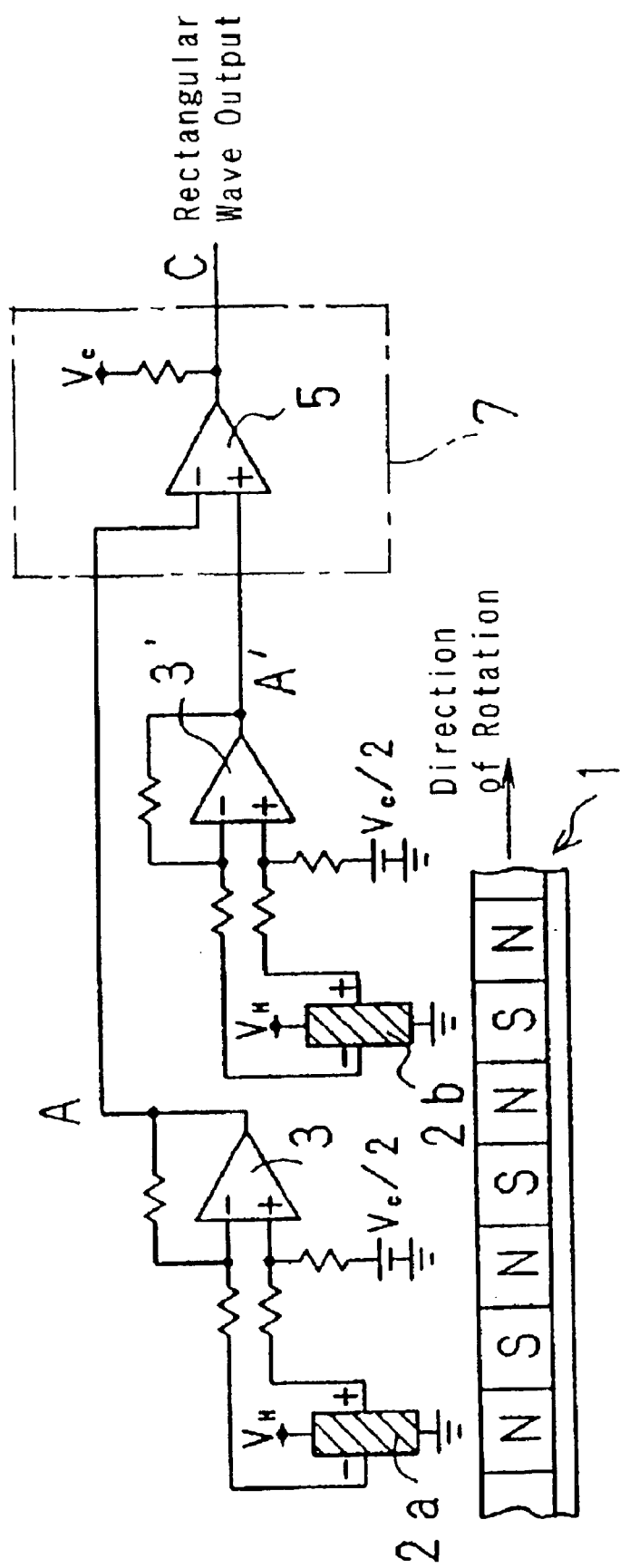

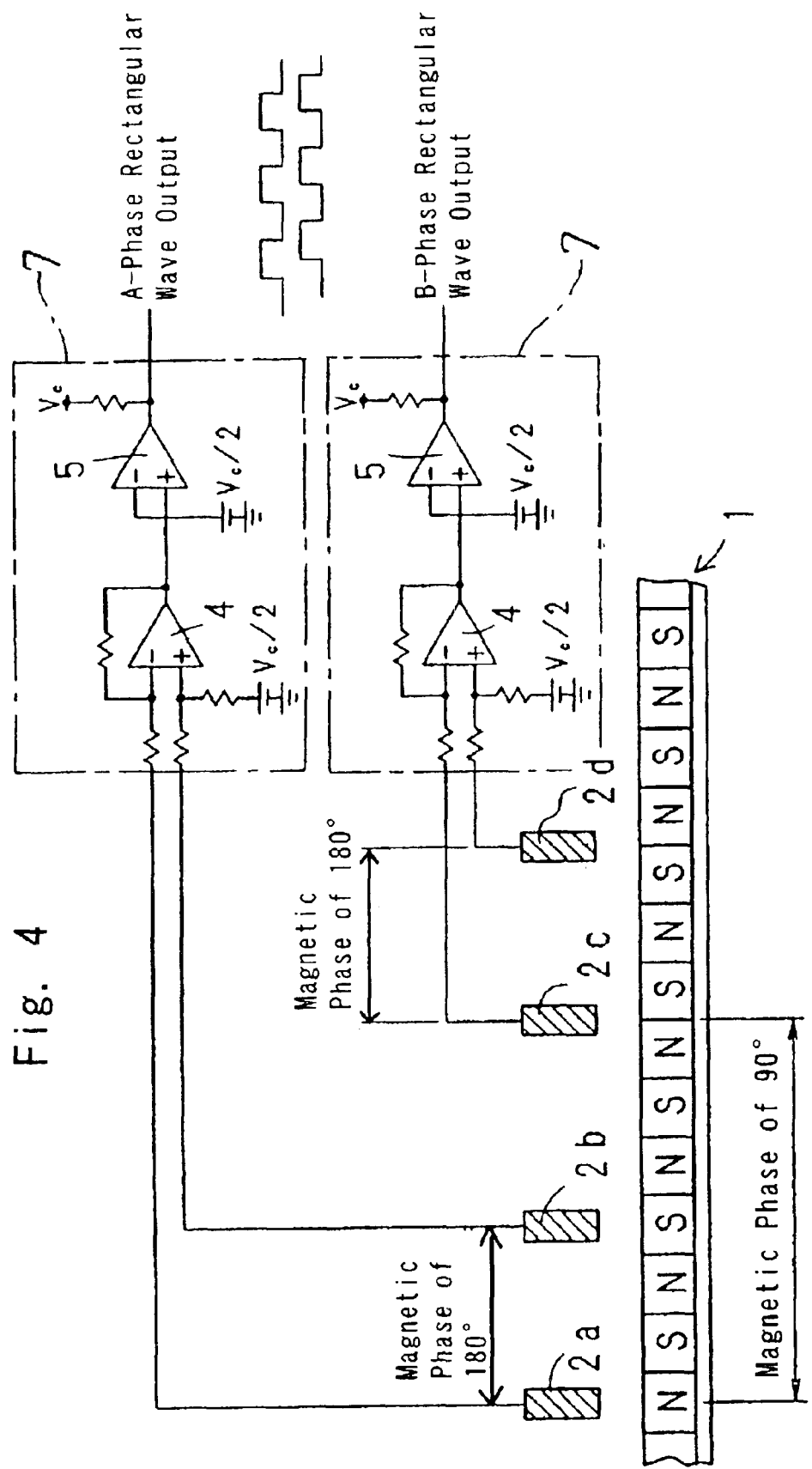

MAGNETIC SPEED SENSOR-EQUIPPED BEARING ASSEMBLY AND MOTOR USING THE SAME

BACKGROUND OF THE INVENTION

1. (Field of the Invention)

The present invention generally relates to a sensor-equipped bearing assembly having a rotational speed sensor incorporated therein and, more particularly, to the sensor-equipped bearing assembly used in and in the vicinity of a magnetic field of a relatively high intensity such as generated in a general purpose electric motor.

2. (Description of the Prior Art)

The sensor-equipped bearing assembly is well known in the art. By way of example, the conventional sensor equipped bearing assembly 51 is shown in FIG. 8, which includes an inner race 52, an outer race 53 accommodating the inner race 52 therein with an annular bearing space defined between it and the inner race 52, and a row of rolling elements 54 retained by a retainer or cage 55 and interposed between the inner and outer races 52 and 53 within the annular bearing space. A ring-shaped encoder 56 is fixed to one of the inner and outer races 52 and 53, for example, the inner race 52, that is rotatable, and a magnetic sensor 57 which may be a Hall element or the like is secured to the other of the inner and outer races 52 and 53, for example, the outer race 53, that is stationary, in face-to-face relation with the ring-shaped encoder 56. The magnetic encoder 56 is in the form of a rubber magnet having N and S poles magnetized therein so as to alternate with each other in a direction circumferentially thereof. This magnetic sensor 57 is housed within a resin casing 58 and is then resin-molded. Securement of this magnetic sensor 57 to the outer race 53 is made by rigidly securing the resin casing 58, with the magnetic sensor 57 therein, to the outer race 53 through a metallic casing 59.

According to the conventional sensor-equipped bearing assembly of the structure discussed above, as the inner race 52 rotates relative to the outer race 53, the magnetic sensor 57 detects change in polarity of the magnetic encoder 56 then rotating together with the inner race 52 and then to output a detected output signal in the form of a train of pulses as shown in FIG. 9. The pulse signal outputted from the magnetic sensor 57 provides an indication of not only the number of revolutions of the inner race 52, but also the direction of rotation of the inner race 52 relative to the outer race 53. The sensor-equipped bearing assembly of the type referred to above is compact in size and robust and requires no complicated assembling adjustment and is accordingly widely used in various electric motors for supporting a drive shaft.

The conventional sensor-equipped bearing assembly discussed above is disclosed in, for example, the Japanese Laid-open Patent Publication No. 2002-174258.

However, it has often been found that when the sensor-equipped bearing assembly of the structure shown in FIG. 8 is placed in a magnetic circuit of a magnetic coil or magnet capable of generating a magnetic field of a relatively high intensity, the sensor-equipped bearing assembly 51 tends to provide an erroneous output under the influence of leakage fluxes resulting from an external magnetic field.

By way of example, with reference to FIG. 10, the situation will be discussed in which the sensor-equipped bearing assembly is incorporated in an electric motor for rotatably supporting a drive shaft 62. In this illustrated example, a rotor 61 mounted on the drive shaft 62 for rotation together therewith is rotatably supported by a housing 63 by means of a front bearing assembly 64 and a rear bearing assembly 65 represented by the sensor-equipped bearing assembly. A stator 60 is fixed to the housing 63 so as to encircle the rotor 61. In this structure, when a high electric current is supplied to the stator 60, flow of magnetic fluxes cannot be neglected and as shown by the arrow in FIG. 10 a magnetic loop is created that extends from the stator 60 back to the stator 60 through the rotor 61, then through the drive shaft 62, through the inner race 52, through the outer race 53 and finally through the housing 63. As a matter of course, when the electric current flows in a direction reverse to that described above, the magnetic loop correspondingly reverses in direction.

At this time, since except for the rolling element 54 and the retainer 55, the annular bearing space between the inner and outer races 52 and 53 is dominantly occupied by non-magnetic elements and provides a high magnetic resistance, some of the magnetic fluxes tend to leak and the resultant leakage fluxes adversely affect the magnetic sensor 57.

For the magnetic sensor 57, a combination of a hall element, a Hall IC (integrated circuit) constructed of an integrated circuit for converting an output signal from the Hall element into a digital signal and a MR element (magnetic resistance element) is generally employed. FIG. 11 illustrates an exemplary inner structure of the Hall IC, which includes a Hall element 71 for detecting a magnetic field, an amplifier circuit 72, a Schmitt trigger circuit 73 and an output transistor 74. While the Hall IC is available in two types, a switch type that is switched on and off depending on the strength of the magnetic field and a alternating magnetic field type that is switched on and off when S and N poles of the magnet are alternately applied, the alternating magnetic field type is generally employed in the rotation sensor. Hereinafter, undesirable influences brought about by the leakage fluxes on the sensor-equipped bearing assembly will be discussed in reference to the example in which the Hall IC shown in FIG;. 11 is employed.

When no leakage flux exist, as shown in FIG. 12, an alternating magnetic field is applied to the Hall IC of the magnetic sensor 57 as the magnetic encoder 56 shown in FIG. 8 rotates. An analog signal thus outputted from the Hall IC is converted into a pulse signal having ON and OFF states alternating each time the analog output exceeds a threshold value, which pulse signal has a duty ratio (Tp/Tn) of about 50%.

When leakage fluxes act externally, as shown in FIG. 13A, the alternating magnetic field applied to the Hall IC of the magnetic sensor 57 offsets upwardly or downwardly depending on the direction in which the leakage fluxes act. Because of this, the output from the Hall IC of the magnetic sensor 57 has its duty ratio varying as shown in FIGS. 13B and 13C. Also, the amount of offset increase with increase of the leakage fluxes and may result in drop-out of one or some of the output pulses and/or failure of the Hall IC to provide the output.

SUMMARY OF THE INVENTION

In view of the foregoing, the present invention is intended to provide a sensor-equipped bearing assembly wherein cluttering of the output from the magnetic encoder which would result from influences brought about by the leakage flux flowing through the magnetic sensor can be minimized to provide a stabilized sensor output.

Another important object of the present invention is to provide an electric motor of which number of revolutions can be accurately detected regardless of the influences brought about by magnetic fluxes used to drive the electric motor.

In order to accomplish these objects of the present invention, the present invention is applied to a sensor-equipped bearing assembly that includes inner and outer races serving respective race members, with the inner race positioned inside the outer race with an annular bearing space defined therebetween, at least one row of rolling elements rollingly accommodated within the annular bearing space while being interposed between the inner and outer races, and a rotation sensor for detecting a rotational speed of a rotating element.

In accordance with one aspect of the present invention, the rotation sensor includes a to-be-detected portion mounted on one of the inner and outer race members, which is rotatable, and having such a magnetic characteristic that N and S poles are alternately magnetized in a direction circumferentially of the race members, and a magnetic detecting portion mounted on the other of the inner and outer race members, which is stationary, in face-to-face relation with the to-be-detected portion. The magnetic detecting portion includes a plurality of magnetic sensors capable of outputting an analog signal and arranged in a direction circumferentially of the magnetic detecting portion. A differential output generating means is provided for processing a differential output of two magnetic sensors as an encoder signal for one phase.

The encoder signal referred to above may be a pulse signal of, for example, a rectangular waveform. The magnetic sensors are preferably used in a pair and are disposed in a spaced, but adjoining relation to each other. It is, however, to be noted that the number of pairs of the magnetic sensors that can be used in the practice of the present invention may not be limited to one pair, but two or more pairs may be employed and, in either case, the differential output generating means for processing the differential output is employed for each of the magnetic sensors employed.

According to the present invention, since the differential output generating means is employed to process the differential output of the two magnetic sensors as the encoder signal for one phase, influences brought about by the leakage fluxes on the encoder signal, that is an output signal from the differential output generating means, can conveniently be minimized even though the leakage fluxes adversely affect the magnetic sensors. By way of example, it is possible to suppress any unwanted change in duty ratio of the encoder signal to thereby avoid any possible erroneous operation. Because of this, the sensor output can be stably obtained even when the magnetic sensors are used under an environment in which the external leakage flux acts thereon.

Preferably, the two magnetic sensors providing the differential output may be arranged so as to be spaced a magnetic phase difference of about 180° from each other with respect to a recurrent magnetic phase of the to-be-detected portion in which the N and S poles alternate. Where the two magnetic sensors are arranged so as to be spaced from each other a magnetic phase difference of about 180° with respect to the recurrent magnetic phase of the to-be-detected portion in which the N and S magnetic poles alternate with each other, the amplitude of the differential output can be amplified substantially double even when the gain of the differential output generating means is 1, and it is accordingly possible that the sensitivity can increase to such an extent as to minimize any adverse influence brought about by the leakage fluxes. It is to be noted that the phase difference of about 180° referred to above is the phase difference in recurrent cycle within a unit of 360° and will be represented by the difference obtained as an odd value when divided by 360° in the event that the phase difference increases over 360° to, for example, 540°.

Also preferably, the two magnetic sensors providing the differential output may be arranged so as to be spaced 90° from each other in a direction circumferentially of the stationary race member.

Where the two magnetic sensors are spaced an angle in excess of 90°, the direction in which the leakage fluxes pass through the magnetic sensors will be different for each of the magnetic sensors and, correspondingly, the direction in which an output from each of the magnetic sensors offsets will reverse. Because of this, the offset cannot be eliminated completely even though a difference between the respective outputs of the magnetic sensors is extracted and, hence, change in duty ratio of the encoder signal would possibly occur. Accordingly, the spacing of the magnetic sensors within 90° is accordingly preferred.

In addition, each of the magnetic sensors used in the magnetic detecting portion preferably has a low sensitivity enough to avoid an output saturation even when an external magnetic field in an environment of use of the sensor-equipped bearing assembly acts thereon. In other words, each of the magnetic sensors used in the sensor-equipped bearing assembly of the present invention is preferably of a type having a sensitivity sufficiently low enough to avoid an output saturation even when an external magnetic flux acts in the environment of use of the sensor-equipped bearing assembly.

Under the environment in which the leakage fluxes acting on the magnetic sensors are abundant, the amount of offset of the respective outputs of the magnetic sensors is considerable enough to assume a saturated condition. In such case, the waveform of each of the sensor outputs will be deformed, accompanied by change in duty ratio and, in the worse case it may occur, one or some of the pulses will drop out. Accordingly, when the sensor-equipped bearing assembly of the present invention is to be used under such an environment abundant of the leakage fluxes, the sensitivity of each of the magnetic sensors has to be lowered and by so doing, it is possible to suppress the saturation.

In a further preferred embodiment of the present invention, each of the magnetic sensors providing the differential output may be made up of a Hall element, in which case an output reference voltage aligning means is used for controlling an electric power source voltage for one of the Hall elements with respect to a reference voltage defined at an output intermediate point of the other of the Hall elements such that an output intermediate point of such one of the Hall elements attains the substantially same voltage as the reference voltage.

Where the Hall element is employed for each of the magnetic sensors, about half of the electric power source voltage to be applied to the Hall element will be an output reference voltage. This value may vary from one element to another and, also, the characteristic value such as sensitivity thereof varies from one element to another and, accordingly, it may occur that the offset brought about by the leakage fluxes may not be eliminated completely even though a difference between respective outputs of these Hall elements is extracted. While the characteristic of each of the Hall elements cannot be corrected, the offset can be suppressed if the output reference voltage is aligned and, accordingly, it is possible to minimize the change in duty ratio.

According to another aspect of the present invention, there is also provided an electric motor including a housing, a stator secured to the housing, a drive shaft, and a rotor mounted on the drive shaft for rotation together therewith and disposed in face-to-face relation with the stator. This electric motor also includes the sensor-equipped bearing assembly of the structure discussed hereinabove for rotatably supporting the drive shaft to the housing.

The sensor-equipped bearing assembly used to support the motor drive shaft rotatably is often used under the environment abundant of the leakage fluxes. However, the use of the sensor-equipped bearing assembly of the present invention in the electric motor to support the motor drive shaft is effectively robust against any adverse influence brought about by the leakage fluxes under the environment of use thereof and, accordingly, the encoder output can be obtained stably.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 1B is a circuit diagram showing a conceptual construction of a magnetic encoder and a magnetic sensor used in the sensor-equipped bearing assembly shown in FIG. 1A;

FIGS. 2A to 2D are charts showing waveforms of output signals outputted from electric component parts of the rotation sensor used in the sensor-equipped bearing assembly, respectively;

FIG. 3 is a circuit diagram showing a modified form of an output processing circuit of the magnetic sensor used in the sensor-equipped bearing assembly;

FIG. 4 is a circuit diagram showing a further modified form of the output processing circuit of the magnetic sensor used in the sensor-equipped bearing assembly;

DETAILED DESCRIPTION OF THE EMBODIMENTS

Figure 1A:
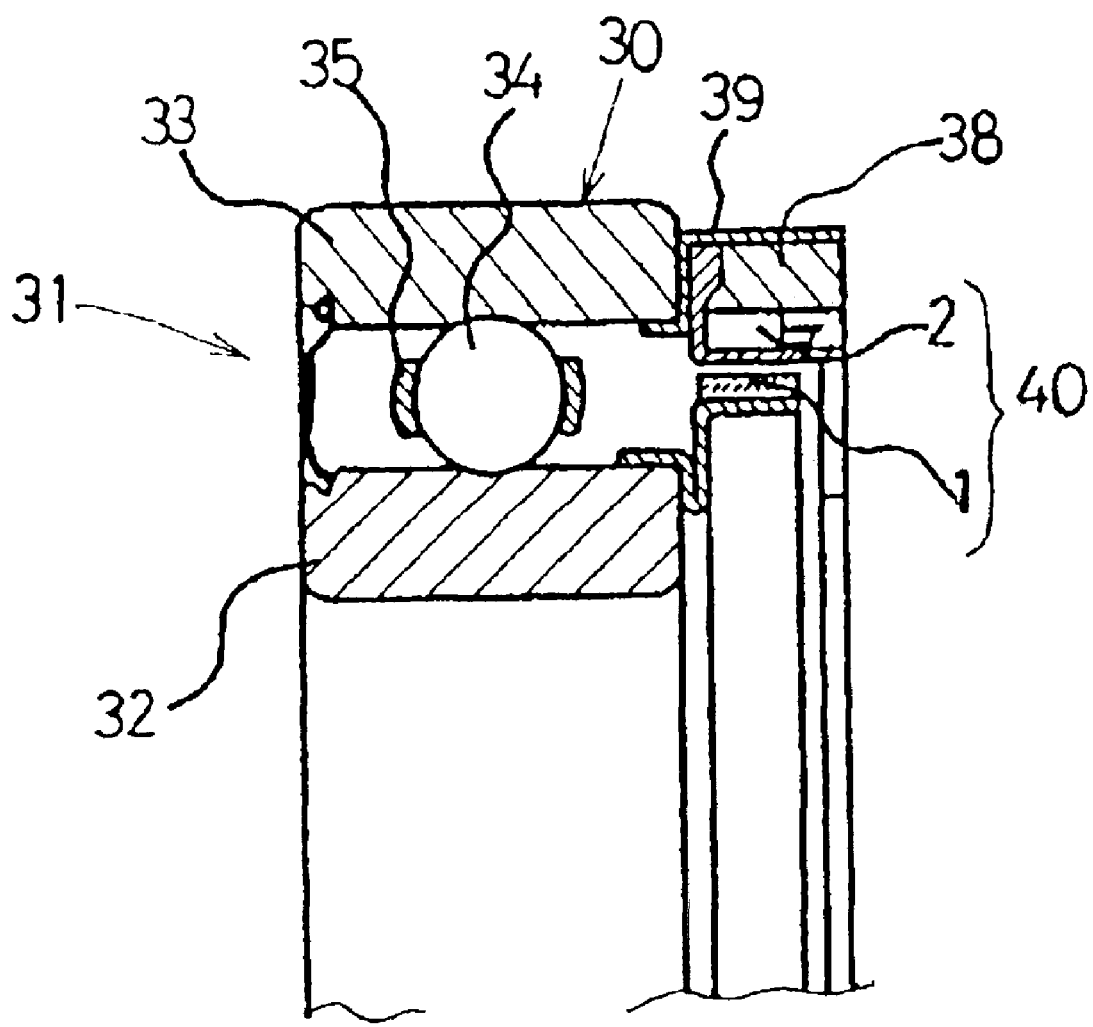
FIG. 1A is a fragmentary longitudinal sectional view showing an important portion of a sensor-equipped bearing assembly according to a first preferred embodiment of the present invention.

A sensor-equipped bearing assembly according to a first preferred embodiment of the present invention will be described with reference to FIGS. 1 and 2. The sensor-equipped bearing assembly generally identified by 31 is in the form of a rolling bearing assembly 30 that includes two race members 32 and 33, which define inner and outer races, respectively, with an annular bearing space defined between those race members 32 and 33, and at least one row of rolling elements 34 rollingly accommodated within the annular bearing space while being interposed between the race members 32 and 33. The rolling bearing assembly 30 also includes a rotation sensor subassembly 40 incorporated therein for detecting the rotational speed, that is, the number of revolutions of a rotating element (not shown) that is rotatably supported by the sensor-equipped bearing assembly 31. The rolling elements 34 are retained by a retainer or cage 35 having a corresponding number of pockets defined circumferentially therein for receiving the corresponding rolling elements in a manner well known to those skilled in the art. The rolling bearing assembly 30 referred to above may be a assembly.

The rotation sensor subassembly 40 is made up of a to-be-detected portion 1 secured to one end of one of the inner and outer race members that is rotatable, for example, the inner race member 32, and a magnetic detecting portion 2 that is mounted to the stationary outer race 33 in face-to-face relation with the to-be-detected portion 1. In the illustrated embodiment, the rotatable race member 32 is assumed to be an inner race whereas the stationary race member 33 is assumed to be an outer race. As will be described in detail later, the magnetic detecting portion 2 is made up of a plurality of magnetic sensors. These magnetic sensors are accommodated within a resin casing 38 and is resin-molded therein, which resin casing 38 with the magnetic sensors therein is fixed to the outer race 33 by means of a metallic casing 39 fitted thereto.

FIG. 1B schematically illustrates electric circuits of the to-be-detected portion 1 and the magnetic detecting portion 2, respectively. The to-be-detected portion 1 mounted to one end face of the rotatable inner race 32 is employed in the form of, for example, a magnetic encoder of a type in which N and S magnetic poles are magnetized alternately with each other in a direction circumferentially thereof. The to-be-detected portion 1 that is the magnetic encoder includes a ring-shaped backing metal 1a and a magnetic element 1b provided on an outer peripheral surface of the backing metal 1a and is fixed to the rotatable inner race 32 through the backing metal 1a. The magnetic element 1b may be in the form of, for example, a rubber magnet that is bonded by vulcanization to the backing metal 1a. It is, however, to be noted that the magnetic element 1b may be made a plastics magnet, a sintered magnet or a metallic magnet, in which case the use of the backing metal 1a may not be always essential.

The magnetic detecting portion 2 mounted to the stationary outer race 33 in face-to-face relation with the to-bedetected portion 1 may employ a pair of two magnetic sensors 2a and 2b each capable of outputting an analog signal indicative of change in density of magnetic fluxes. These magnetic sensors 2a and 2b are spaced a predetermined distance from each other in a direction circumferentially of the stationary outer race 33. By way of example, in the illustrated embodiment, the magnetic sensors 2a and 2b are spaced a magnetic phase difference of 180° from each other in the circumferential direction. This magnetic phase difference represents a difference in phase in magnetic phase of the to-be-detected portion 1 that is alternately magnetized to N and S poles. For each of the magnetic sensors 2a and 2b, a Hall element or a Hall IC of an analog output type, for example, can be employed. In the illustrated embodiment, however, the Hall element is employed for each of the magnetic sensors 2a and 2b. The Hall IC is an integrated circuit having a Hall element. Where the Hall element is employed for each of the magnetic sensors 2a and 2b, the magnetic elements 2a and 2b, that is, the Hall elements provide respective outputs of different phases, that is, +phase and −phase outputs at a time, and differential amplification of these outputs of different phases are carried out by means of respective differential amplifier means 3 and 3' to thereby provide a Hall element signal. When shown in FIG. 1B, the output signals of the magnetic sensors 2a and 2b appear at points A and A', respectively. Each of the differential amplifier means 3 and 3' is comprised of an operational amplifier.

The respective analog outputs from the magnetic sensors 2a and 2b are fed to a differential output generating means 7 that processes the differential outputs as one phase of an encoder signal. This differential output generating means 7 includes a differential amplifier circuit 4 utilizing an operational amplifier and a comparator 5 for performing a rectangular wave modulation on an output from the differential amplifier circuit 4 to thereby provide a rectangular wave output.

The operation of the rotation sensor subassembly 40 will now be described. Assuming that the to-be-detected portion 1 rotates in one direction at a constant speed relative to the magnetic detecting portion 2, respective outputs from the adjoining two magnetic sensors 2a and 2b that appear at the points A and A' vary sinusoidally with respect to a base line represented by a predetermined voltage (Vc/2) as shown by dotted lines in FIGS. 2A and 2B, respectively, wherein Vc represents the voltage of an electric power source. In the event that a leakage flux is applied, the respective outputs from the magnetic sensors 2a and 2b are offset with increase of the leakage flux as shown by the solid lines in FIGS. 2A and 2B. It is, however, to be noted that the direction in which the output from each of the magnetic sensors 2a and 2b varies depending on the direction of the external leakage flux. Also, if it is assumed that the two magnetic sensors 2a and 2b have the same sensitivity and the same amount of leakage fluxes, the respective amounts of offset of the outputs from the magnetic sensors 2a and 2b are the same.

When differential amplification of the outputs of the magnetic sensors 2a and 2b at the points A and A' respectively, are performed by the differential amplifier means 4 by means of their operational amplifiers, it is possible to obtain a differential output (FIG. 2C) that is free from an offset component resulting from the leakage flux. Since when the two magnetic sensors 2a and 2b are disposed having been spaced a magnetic phase difference of 180°, the amplitude of the differential output appearing at the point B in FIG. 1B is amplified substantially double even though the differential amplifying means 4 has a gain of 1, it can be suspected that as a result of increase of the sensitivity the rotation sensor subassembly 40 will hardly be affected by the leakage flux. It is to be noted that in the example now under discussion, the differential output from the differential amplifier means 4 is based relative to the reference voltage of Vc/2. In the subsequent stage, the differential output from the differential amplifier means 4 is subjected by the comparator 5 to the rectangular wave modulation with respect to the reference represented by the predetermined voltage (Vc/2), resulting in an encoder signal for one phase from which influences of the leakage flux has been removed and in which variation of the duty ratio is therefore minimized as shown in, FIG. 2D.

It is to be noted that instead of the use of a combination of the differential amplifier means 4 and the comparator 5 employed to form the differential output generating means 7, only the comparator 5 may be employed as shown in FIG. 3, which compares the respective outputs from the magnetic encoders 2a and 2b with each other to thereby achieve the rectangular wave modulation. Even in such case, the differential output of these magnetic sensors 2a and 2b can be processed as an encoder signal for one phase.

In the foregoing description, reference has been made to the case applicable to the encoder output for single phase. However, where two phase outputs for A and B phases are required, an additional pair of magnetic sensors 2c and 2d may be employed and disposed at a location spaced a magnetic phase of 90 ° from the first pair of the magnetic sensors 2a and 2b in the circircumferential direction, in combination with the use of a signal processing means such as the differential output generating means 7 and others, In a manner similar to that described above, for each pair of the magnetic sensors as shown in FIG. 4. It is to be noted that in FIG. 4 for the sake of simplicity circuits accessory to the magnetic sensors 2a and 2d are not illustrated and that even for each of the magnetic sensors 2a to 2d, a circuitry encompassed by the dotted line H in FIG. 1, that is, a circuitry that corresponds to the differential amplifier means 3 for two outputs of respective phases reverse to each other, i.e., plus and minus phases of the Hall element is employed. Although in the example shown in FIG. 4, after the respective outputs from the two magnetic sensors have been differential amplified, the resultant differential output is subjected to the rectangular wave modulation by means of the comparator 5, the differential amplifier means 4 may be dispensed with and, instead, the differential output generating means 7 is comprised of the sole comparator 5 as is discussed with reference to FIG. 3.

Figure 5:
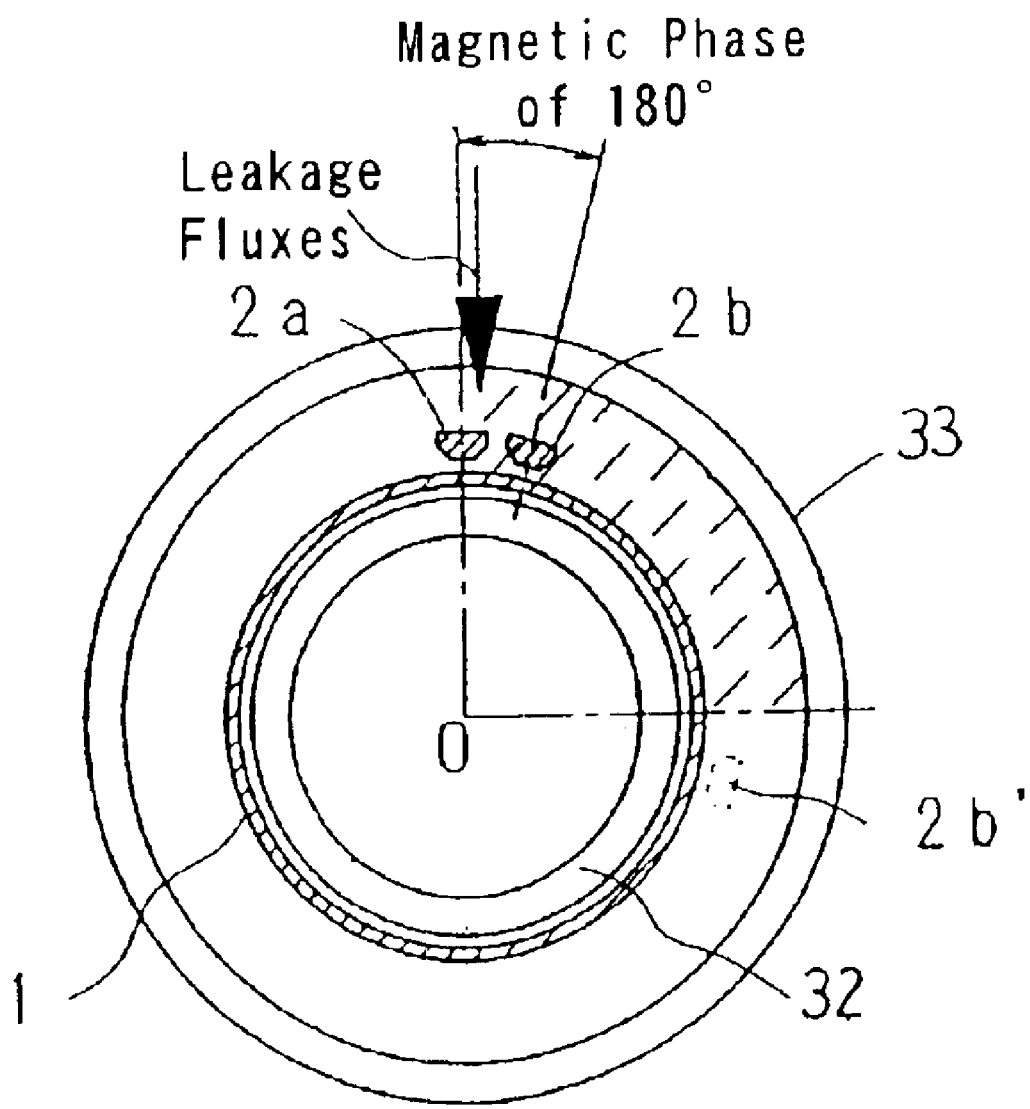
FIG. 5 is an end view of the sensor-equipped bearing assembly, showing the relationship in position between elements forming the magnetic sensor.

As hereinabove described, the differential output of these two magnetic sensors 2a and 2b (2c and 2d) has to be secured in order to obtain the output for single phase of the encoder. If the magnetic sensors 2a and 2b (2c and 2d) are disposed adjacent to each other as shown in FIG. 5 so that the magnetic sensors can receive the substantially same amount of influences brought about by the leakage flux, the resistance to the leakage fluxes can be increased.

Even where the magnetic sensors 2a and 2b cannot be disposed adjacent to each other by reason of a limitation in positioning, it is preferred that the two magnetic sensors 2a and 2b be disposed within 90° coverage of the stationary outer race 33. By way of example, where one of the magnetic sensors, for example, the magnetic sensor 2b is disposed at a location shown by the phantom line 2b' in FIG. 5 that exceeds 90° in the circumferential direction from the position of the other magnetic sensor 2a, since the direction in which the leakage flux passes through the magnetic sensors is different for each of the magnetic sensors, the respective directions of offset of the outputs from the associated magnetic sensors will be opposed to each other and, therefore, the offset cannot be completely eliminated even though a difference between those output signals is extracted. In such case, it may occur that variation of the duty ratio of the encoder signal will increase. Because of this, the magnetic sensors are preferred to be disposed within the 90° coverage of the stationary outer race 33.

Also, under the environment in which the leakage fluxes acting on the magnetic sensors 2a and 2b are considerable, it may occur that the amounts of offset of the outputs from the magnetic sensors 2a and 2b will increase considerably enough to result in a saturated condition. Since in such case the respective waveforms of the outputs from the magnetic sensors will deform undesirably, accompanied by change in duty ratio, drop-out of one or some of the pulses will occur in the case it may occur.

Where the rotation sensor subassembly 40 is used under such an environment in which a strong leakage flux acts, saturation can be suppressed if the magnetic sensors 2a and 2b is used with their sensitivities lowered down to the sensitivity with which they are normally used. This can be implemented by, if the magnetic sensors 2a and 2b is comprised of the Hall element, lowering the voltage applied to the Hall element down to a value lower than a standard voltage applied to the Hall element, or lowering a drive current flowing through the Hall element down to a value lower than a standard current applied to the Hall element. It is, however, to be noted that where temperature change is considerable in that environment in which the rotation sensor subassembly is used, a constant voltage drive system in which change in sensitivity of the Hall element is minimal is preferred.

Where the Hall element is used for each of the magnetic sensors 2a and 2b, about half of the power source voltage Vh to be supplied to the Hall element will be an output reference voltage (VH/2). Since this value varies from one element to another and characteristics such as sensitivity varies too from one element to another, it may occur that the offset brought about by the leakage flux cannot be completely removed even though a difference between the respective outputs from the two elements is extracted. While the characteristic of the Hall element cannot be corrected, the offset can be suppressed and change in duty ratio can be minimized, provided that the output reference voltage VH/2 is aligned.

Figure 6:
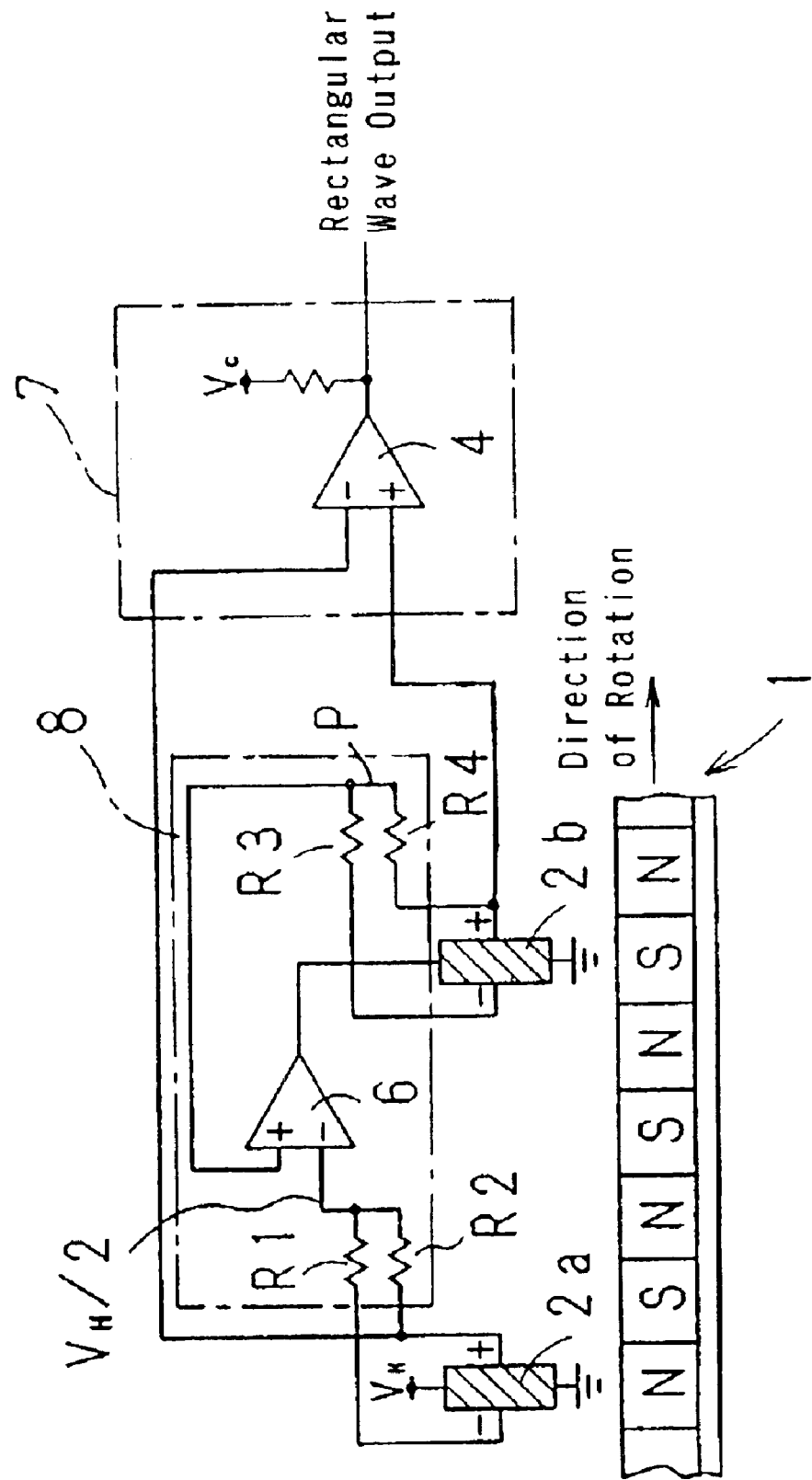
FIG. 6 is a circuit diagram showing the output processing circuit of the magnetic sensor including an output reference voltage aligning means.

In FIG. 6, an exemplary circuit of an output reference voltage aligning means 8 for aligning a reference voltage between the Hall elements is shown. As shown therein, positive (+) and negative (−) output terminals of one of the Hall elements which is the magnetic sensor 2a that is one of the two magnetic sensors from which a differential output is desired to be extracted, are connected in series with each other through resistors R1 and R2 with a junction between the resistors R1 and R2 providing a reference voltage VH/2 for the Hall element of the magnetic sensor 2a. Similarly, positive and negative output terminals of the Hall element which is the magnetic sensor 2b are connected in series with each other through resistors R3 and R4. A voltage difference detecting means 6 for detecting a difference between intermediate point voltages (voltage VH/2 and a voltage at an intermediate point P) is employed so that an output from the voltage difference detecting means 6 can be used as a power source for the Hall element that is the magnetic sensor 2b. With this circuit design, it is possible to control the power source voltage for the magnetic sensor 2b so that the voltage at the intermediate point P and the intermediate point voltage VH/2 can be equalized to each other. The voltage difference detecting means 6 serves as a differential amplifier means comprised of an operational amplifier. The voltage difference detecting means 6 and the resistors R1 to R4 altogether constitute the output reference voltage aligning means 8 referred to hereinbefore. It is to be noted that although in the circuit example shown in FIG. 6, respective outputs from one terminal of the Hall elements of the magnetic sensors 2a and 2b are fed to the comparator 4 so that the encoder rectangular wave output can be obtained, a differential amplifier means similar to that shown in and described with reference to FIG. 1 may be employed in a front stage of the comparator 4.

As hereinabove discussed, if even under the environment rich of leakage fluxes, the encoder output can be stably obtained, the sensor-equipped bearing assembly 31 can be used and there should be no problem even when the sensor-equipped bearing assembly 31 is used as a bearing assembly for rotatably supporting a motor shaft in which the leakage fluxes exist.

Figure 7:
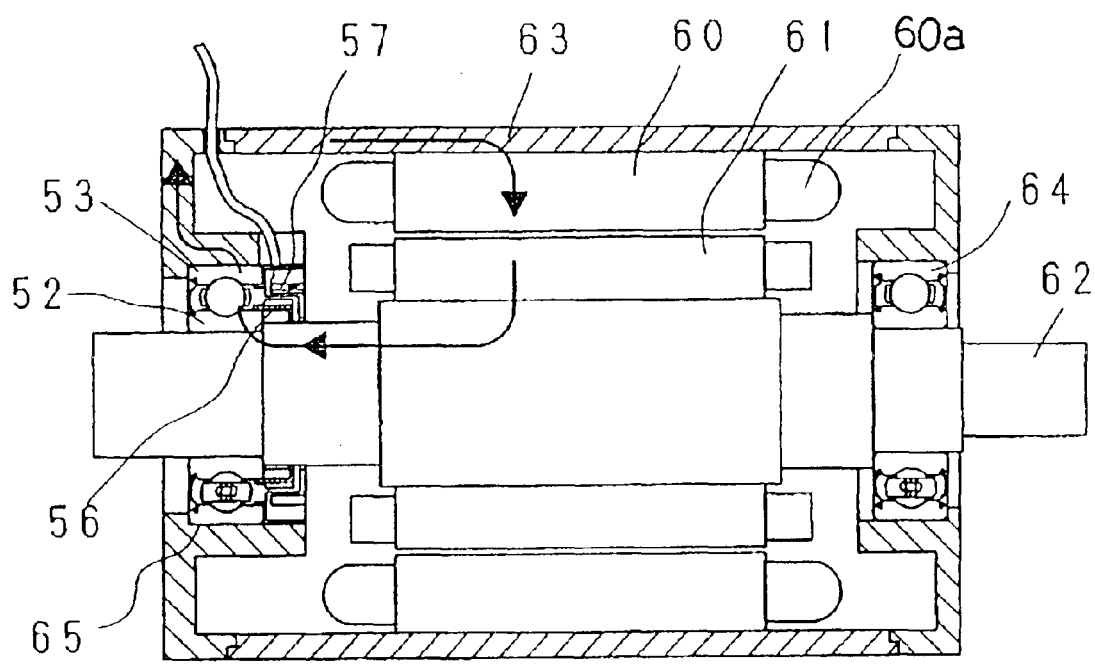
FIG. 7 is a schematic longitudinal sectional view of an electric motor utilizing the sensor-equipped bearing assembly of the present invention.
Figure 8:
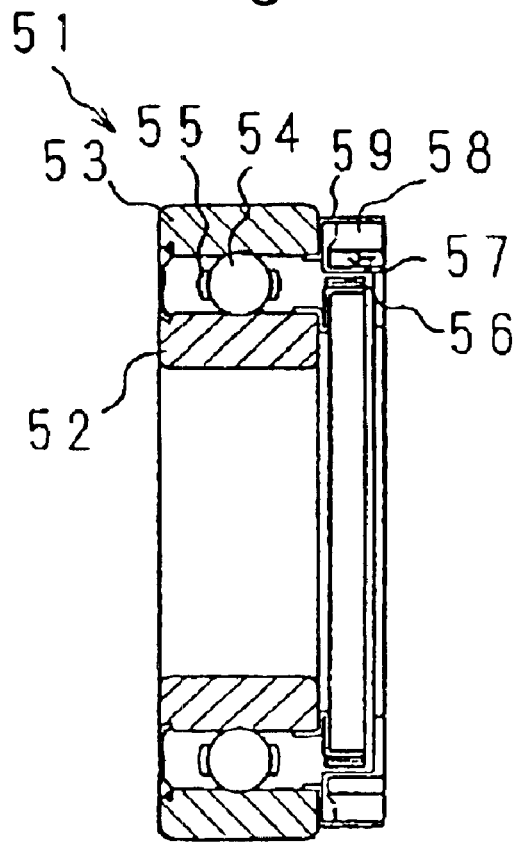
FIG. 8 is a longitudinal sectional view of the conventional sensor-equipped bearing assembly.
Figure 9:
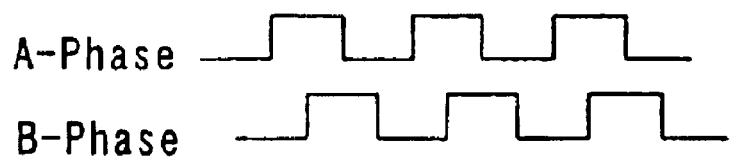
FIG. 9 is a chart showing an output from the conventional sensor-equipped bearing assembly.
Figure 10:
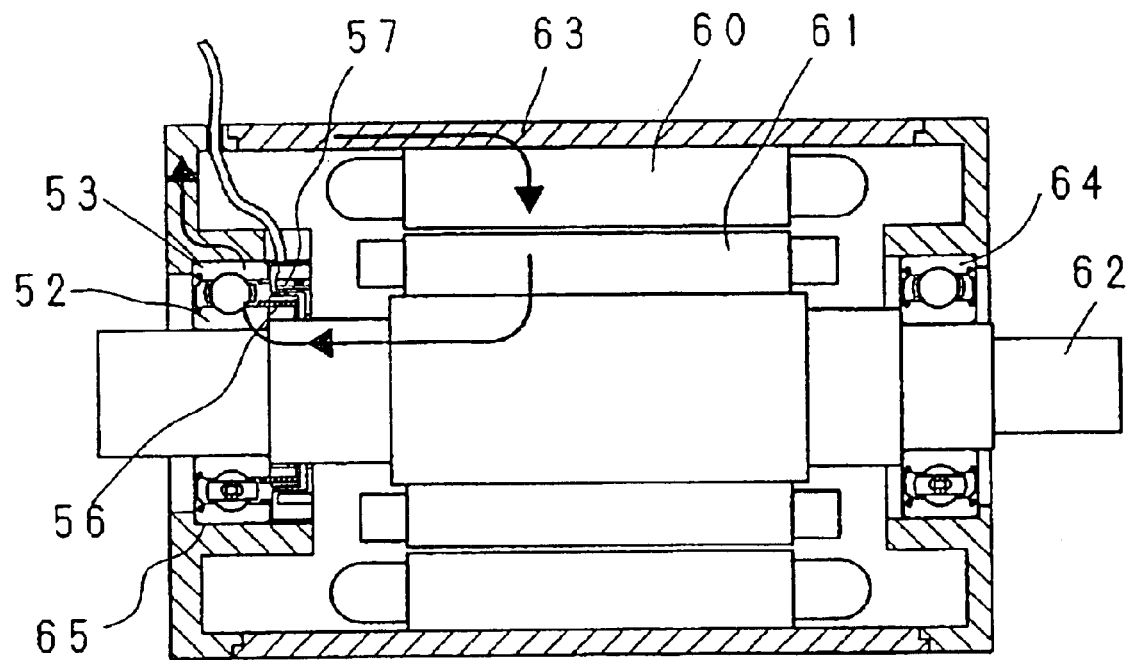
FIG. 10 is a schematic longitudinal sectional view of the electric motor utilizing the conventional sensor-equipped bearing assembly.
Figure 11:
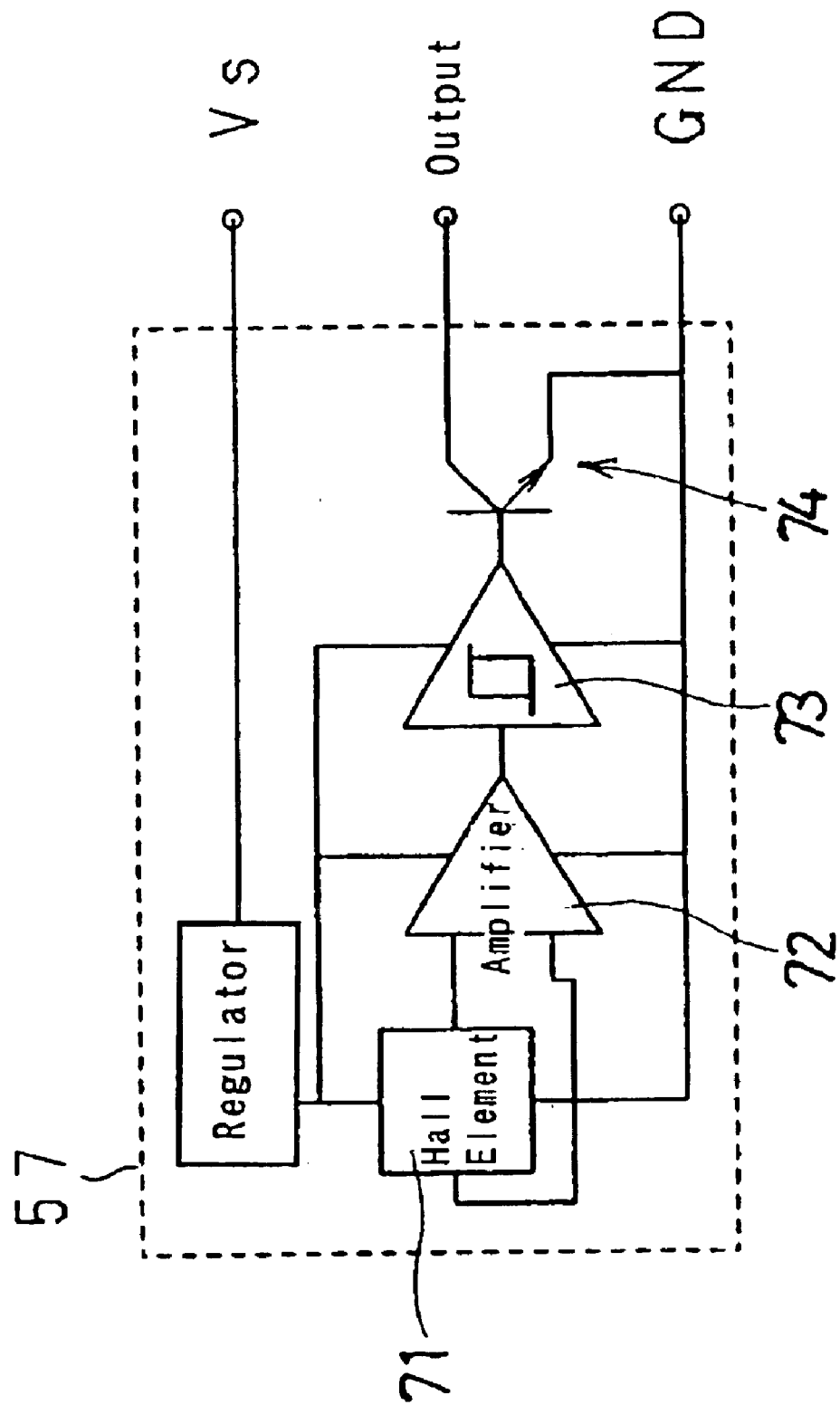
FIG. 11 is a circuit diagram showing the Hall IC employed in the conventional sensor-equipped bearing assembly.
Figure 12:
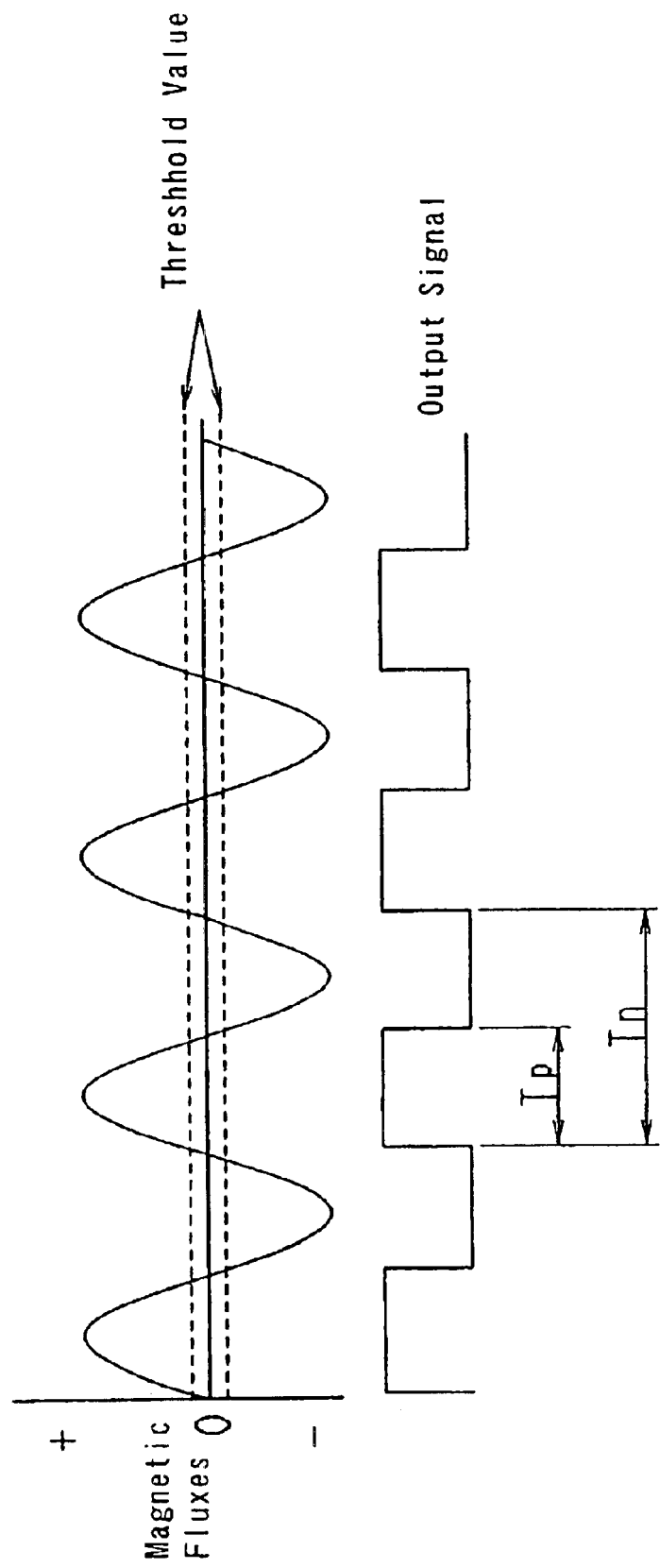
FIG. 12 is a chart showing the output from the Hall IC shown in FIG. 11.
Figure 13A:
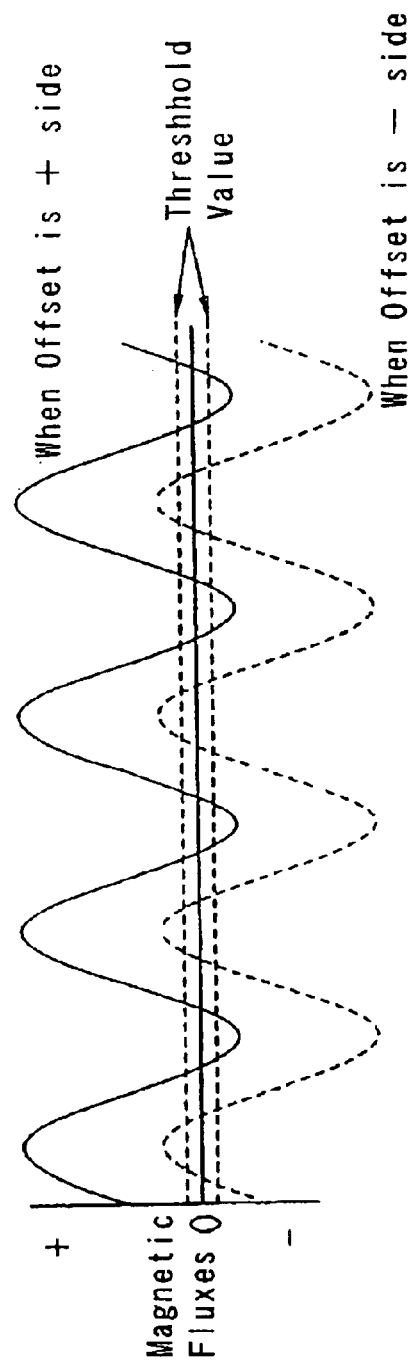
FIGS. 13A to 13C are charts showing waveforms of the output signal from the Hall IC when affected by an external magnetic field, respectively.
Figure 13B:
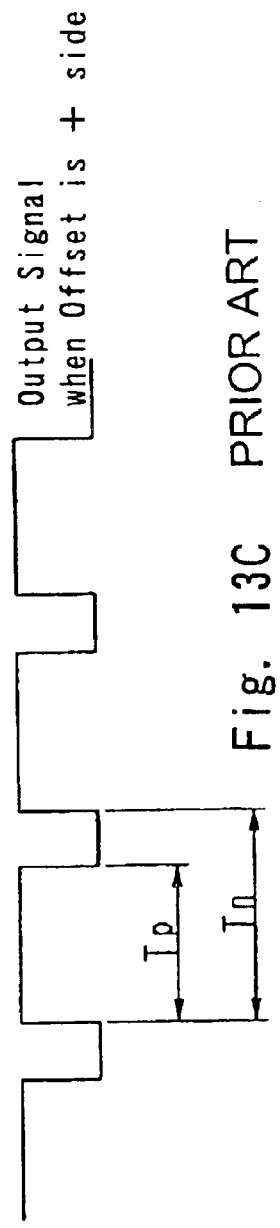
Figure 13C:

FIG. 7 illustrates an example of the motor in which the sensor-equipped bearing assembly 31 of the present invention is used. As hereinbefore described, this electric motor includes a rotor 61 mounted on a drive shaft 62 for rotation together therewith. The drive shaft 62 has its opposite end portions rotatably supported by the housing 63 through bearing assemblies 64 and 65. The electric motor also includes a stator 60 made up of a stator coil 60a and fixed to the housing 63. Of the bearing assemblies 64 and 65, the bearing assembly 65 is employed in the form of the sensor-equipped bearing assembly 31 according to any one of the embodiments of the present invention which have been fully discussed hereinbefore. The bearing assembly 65 represented by the sensor-equipped bearing assembly 31 is, for example, a rear bearing assembly. The front bearing assembly 64 is of a type having no rotation sensor employed therein.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, although in describing the various preferred embodiments of the present invention, the to-be-detected portion 1 and the magnetic detecting portion 2 have been shown and described as opposed with each other in a radial direction, the present invention can be equally applied to the sensor-equipped bearing assembly in which the to-be-detected portion 1 and the magnetic detecting sensor 2 are opposed with each other in an axial direction.

Accordingly, such changes and modifications are, unless they depart from the scope of the present invention as delivered from the claims annexed hereto, to be construed as included therein.

What is claimed is:
1. A sensor-equipped bearing assembly which comprises:
inner and outer races serving respective race members, the inner race being positioned inside the outer race with an annular bearing space defined therebetween;
at least one row of rolling elements rollingly accommodated within the annular bearing space while being interposed between the inner and outer races; and
a rotation sensor detecting a rotational speed of a rotating element, said rotation sensor comprising a to-be-detected portion mounted on one of the inner and outer race members, which is rotatable, and having such a magnetic characteristic that N and S poles are alternately magnetized in a direction circumferentially of the race members, a magnetic detecting portion mounted on the remaining one of the inner and outer race members, which is stationary, in face-to-face relation with the to-be-detected portion, said magnetic detecting portion including a plurality of magnetic sensors outputting an analog signal and arranged in a direction circumferentially of the race members, and a differential output generator processing a differential output of two magnetic sensors as an encoder signal for one phase, wherein each of the magnetic sensors providing the differential output comprises a Hall element; and an output reference voltage aligner controlling an electric power source voltage for one of the Hall elements with respect to a reference voltage defined at an output intermediate point of the other of the Hall elements such that an output intermediate point of such one of the Hall elements attains the substantially same voltage as the reference voltage.

2. The sensor-equipped bearing assembly as claimed in claim 1, wherein the two magnetic sensors providing the differential output are arranged so as to be spaced a magnetic phase difference of about 180° from each other with respect to a recurrent magnetic phase of the to-be-detected portion in which the N and S poles alternate.

3. The sensor-equipped bearing assembly as claimed in claim 1, wherein the two magnetic sensors providing the differential output are arranged so as to be spaced 90° from each other in a direction circumferentially of the stationary race member.

4. The sensor-equipped bearing assembly as claimed in claim 1, wherein each of the magnetic sensors used in the magnetic detecting portion has a sensitivity low enough to avoid an output saturation even when an external magnetic field in an environment of use of the sensor-equipped bearing assembly acts thereon.

5. An electric motor comprising;

a housing;

a stator secured to the housing;

a drive shaft;

a rotor mounted on the drive shaft for rotation together therewith and disposed in face-to-face relation with the stator; and a sensor-equipped bearing assembly for rotatably supporting the drive shaft to the housing, comprising inner and outer races serving respective race members, the inner race being positioned inside the outer race with an annular bearing space defined therebetween, at least one row of rolling elements rollingly accommodated within the annular bearing space while being interposed between the inner and outer races, and a rotation sensor detecting a rotational speed of a rotating element, said rotation sensor comprising a to-be-detected portion mounted on one of the inner and outer race members, which is rotatable, and having such a magnetic characteristic that N and S poles are alternately magnetized in a direction circumferentially of the race members, a magnetic detecting portion mounted on the other remaining one of the inner and outer race members, which is stationary, in face-to-face relation with the to-be-detected portion, said magnetic detecting portion including a plurality of magnetic sensors capable of outputting an analog signal and arranged in a direction circumferentially of the race members, and a differential output generator processing a differential output of two magnetic sensors as an encoder signal for one phase, wherein each of the magnetic sensors providing the differential output comprises a Hall element; and an output reference voltage aligner controlling an electric power source voltage for one of the Hall elements with respect to a reference voltage defined at an output intermediate point of the other of the Hall elements such that an output intermediate point of such one of the Hall elements attains the substantially same voltage as the reference voltage.

* * * * *

UNITED STATES PATENT AND TRADEMARK OFFICE
CERTIFICATE OF CORRECTION

PATENT NO. : 6,882,142 B2
DATED : April 19, 2005
INVENTOR(S) : Takashi Koike et al.

It is certified that error appears in the above-identified patent and that said Letters Patent is hereby corrected as shown below:

Column 11,
Line 5, change "." to -- , --;
Line 42, change ";" to -- : --.

Signed and Sealed this

Twentieth Day of December, 2005

JON W. DUDAS
*Director of the United States Patent and Trademark Office*